United States Patent [19]

André Guyonnet et al.

[11] Patent Number: 5,822,975
[45] Date of Patent: Oct. 20, 1998

[54] BYPASS ENGINE WITH MEANS FOR LIMITING GAS LEAKAGE

[75] Inventors: Xavier Jean-Michel André Guyonnet, 77310-Saint Fargeau Ponthierry; Pascal Claude Wurniesky, 77176-Savigny Le Temple, both of France

[73] Assignee: Societe National D'Etude Et De Auction De Moteurs d'Aviation "Snecma", Paris, France

[21] Appl. No.: 834,877

[22] Filed: Apr. 10, 1997

[30] Foreign Application Priority Data

Apr. 24, 1996 [FR] France ..................... 9605137

[51] Int. Cl.⁶ .................. F02C 7/28; F02K 3/04
[52] U.S. Cl. ........................ 60/226.1; 60/262
[58] Field of Search ............... 60/39.07, 226.1, 60/226.3, 262; 415/116, 173.7, 175, 176

[56] References Cited

U.S. PATENT DOCUMENTS

| | | | |
|---|---|---|---|
| 3,308,625 | 3/1967 | Shaw | 60/262 |
| 3,486,328 | 12/1969 | Boudiques | 60/226.1 |
| 3,768,933 | 10/1973 | Bouiller et al. | 60/226.1 |
| 4,005,575 | 2/1977 | Scott et al. | |
| 5,440,874 | 8/1995 | Charier et al. | |
| 5,586,860 | 12/1996 | Bertrand et al. | |

FOREIGN PATENT DOCUMENTS

| | | |
|---|---|---|
| 1 554 020 | 1/1969 | France . |
| 2 141 435 | 1/1973 | France . |
| 2 597 547 | 10/1987 | France . |
| 2 685 385 | 6/1993 | France . |
| 585331 | 2/1947 | United Kingdom . |

Primary Examiner—Louis J. Casaregola
Attorney, Agent, or Firm—Oblon, Spivak, McClelland, Maier & Neustadt, P.C.

[57] ABSTRACT

A bypass engine including a fan which has its blades disposed in both the primary gas flow path and the secondary gas flow path of the engine is provided with an annular intermediate gas flow path in the space between the primary and secondary flow paths, and gas take-off means is connected to a compressor of the engine and arranged to direct a flow of gas longitudinally along the intermediate flow path to prevent leakage of hot gas to the secondary flow path via the gaps existing between the platforms of the fan blades and the adjacent annular members of the primary and secondary flow paths.

4 Claims, 3 Drawing Sheets

BYPASS ENGINE WITH MEANS FOR LIMITING GAS LEAKAGE

BACKGROUND OF THE INVENTION

1. Field of the Invention

The invention relates to a turbine-engine of the bypass type. The designs of some aircraft engines, such as those having to propel at a supersonic speed, involve a turbine engine having a primary gas flow in which the gases pass through compressors, a combustion chamber and then turbines, and a secondary gas flow which surrounds the primary flow and mixes with it at the outlet of the engine. The secondary flow path can be opened in varying degrees by means of flaps at its intake and on its side walls. These flaps are fully open at subsonic speed, so that a large flow of air passes along the secondary flow path and the bypass ratio of the gases at the exhaust of the engine is substantial, the advantage of this being that the level of noise emission is reduced. On the other hand, at supersonic speed, when it is desired to reduce the bypass ratio, the flaps are closed to restrict the area of the opening of the secondary flow path. French Patent 2685385 describes this type of engine more fully.

A fan which forms part of a compressor in the primary flow path of the engine is used to speed up the flow of gases in the secondary flow path, and for this purpose the blades of the fan are extended so that they are disposed in both flow paths and in the space between them. The annular members which partly bound the two flow paths and separate them from the space between them must therefore be interrupted to accommodate the blades of the fan, and the blades are provided with platforms which are aligned with the annular members to restore the continuity of the flow path walls as much as possible. However, gaps nevertheless remain between the platforms and the annular members.

2. Summary of the Prior Art

It is known to fit these gaps with seals, but they are not completely effective and gas leaks still occur during operation of the engine. This situation is particularly harmful when the fan is situated to the rear of a first compressor, as the gases in the primary flow path are then compressed and hot and can easily leak into the secondary flow path where they can cause damage. This is because the secondary flow path is assumed to be relatively cold and elements thereof tend to be constructed from materials having poor resistance to heat on account of their lower cost.

SUMMARY OF THE INVENTION

It is an object of the invention to prevent, or at least restrict, such leaks and at the same time to improve the performance of the engine. To this end, according to the invention, a bypass engine comprising a primary gas flow path and a secondary gas flow path, a fan having blades disposed both in said primary gas flow path and in said secondary gas flow path, said fan also having first and second annular platforms partly bounding said primary and secondary gas flow paths respectively, first and second annular members respectively aligned with said first and second annular platforms and defining therewith a space between said primary and secondary gas flow paths, is provided with means defining an annular intermediate gas flow path in said space at least in front of the gaps existing between said annular platforms and said annular members, and means for blowing a flow of gas through said intermediate gas flow path, thus creating a dynamic pressure which stops or deflects leakage of gas.

The invention will now be described in greater detail in relation to a preferred embodiment, given by way of example only, and with reference to the accompanying drawings.

DESCRIPTION OF THE PREFERRED EMBODIMENT

Figure 1:
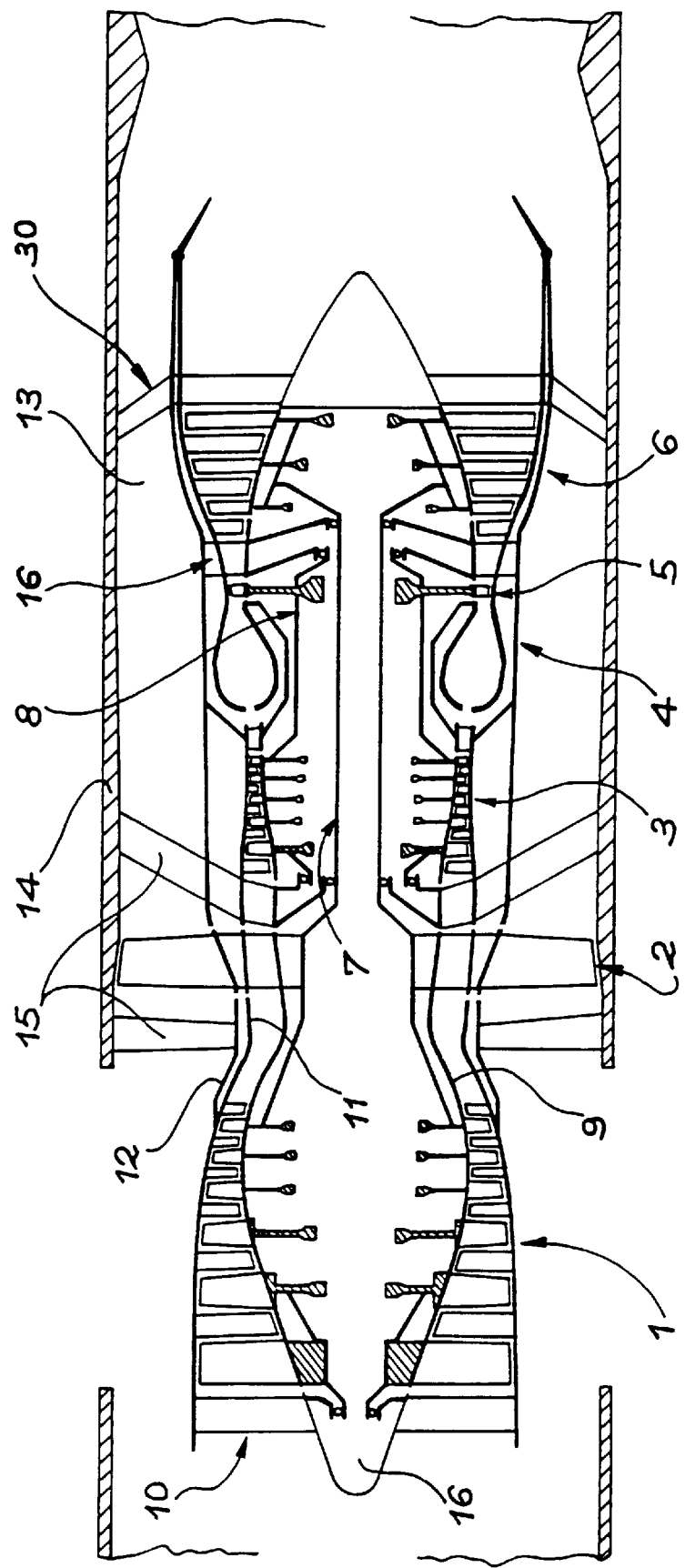
FIG. 1 is a diagrammatic longitudinal sectional view of a ducted fan bypass engine.

The engine shown in FIG. 1 comprises, going from the upstream end towards the downstream end, a low pressure compressor 1, a fan 2, a high pressure compressor 3, a combustion chamber 4, a high pressure turbine 5 and a low pressure turbine 6. The rotors of the low pressure compressor 1, the fan 2 and the low pressure turbine 6 are interconnected by means of a first rotary body 7 so as to rotate together, whereas the rotors of the high pressure compressor 3 and the high pressure turbine 5 are interconnected for rotation together by means of a second rotary body 8. The rotary bodies 7 and 8 carry parts of an envelope 9 which, together with a first annular member 11 which coaxially surrounds the envelope 9, defines an annular primary gas flow path 10.

A second annular member 12 coaxially surrounds the first member 11 and, in conjunction with a casing 14 which constitutes the outer envelope of the engine, defines a secondary gas flow path 13. The two flow paths 10 and 13 join together downstream of the low pressure turbine 6. The assembly is held together by supporting arms 15,16 and 30 which interconnect the casing 14 and the annular members 11 and 12, and also serve as flow straightening vanes.

Figure 2:
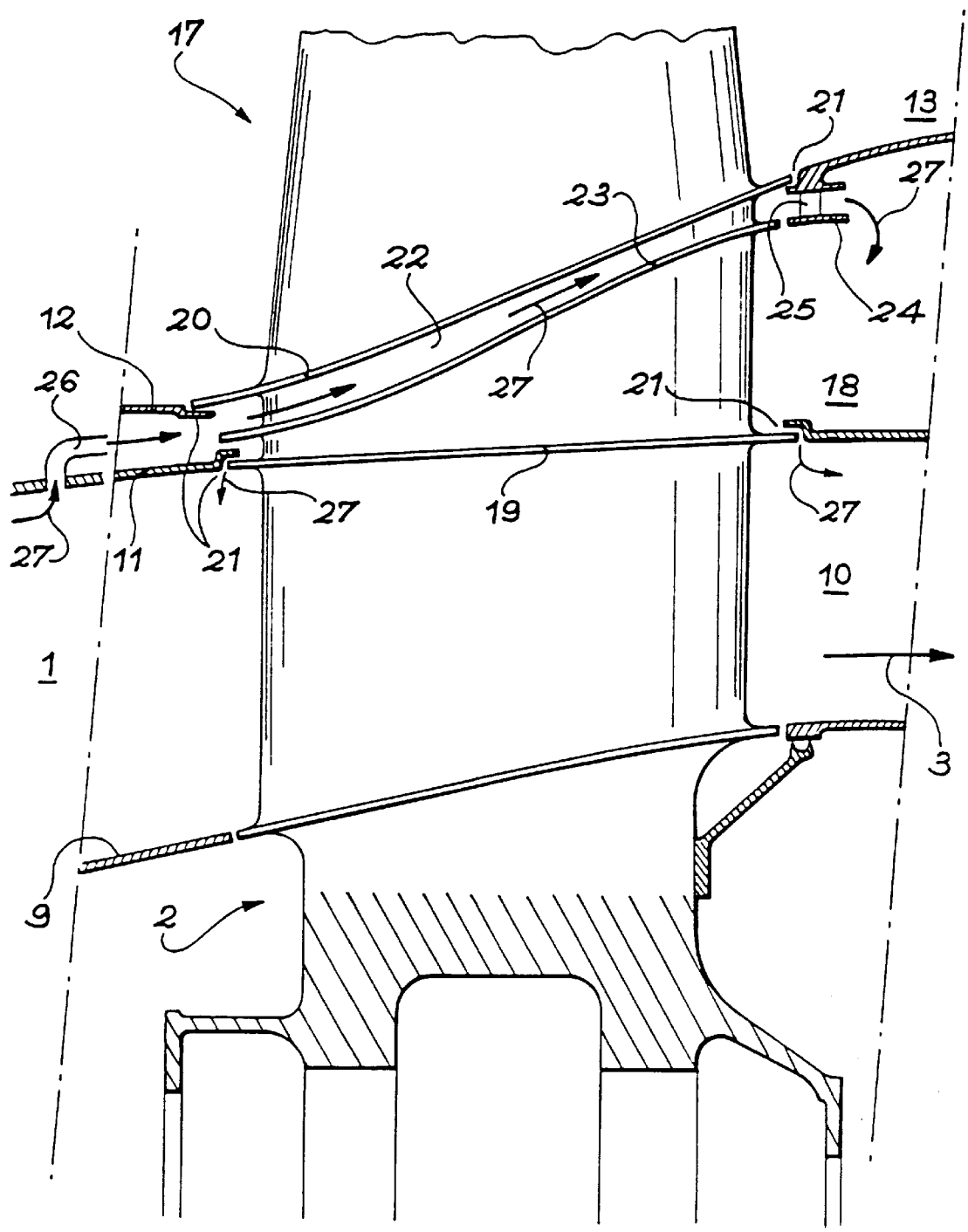
FIG. 2 is a longitudinal sectional view of part of the engine to a larger scale and showing the application of the invention to the engine.
Figure 3:
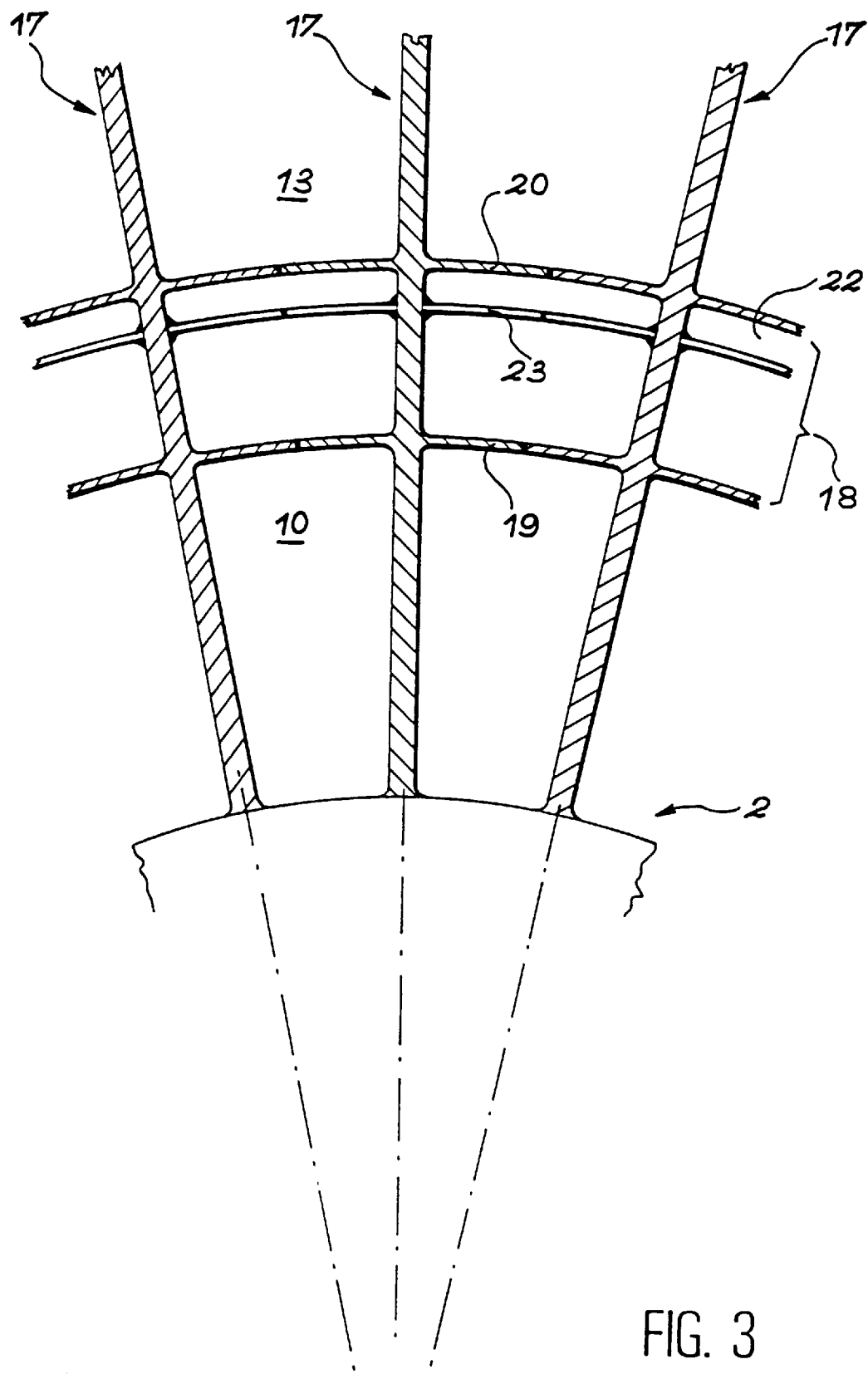
FIG. 3 is a partial radial sectional view of the part of the engine shown in FIG. 2.

With reference now particularly to FIGS. 2 and 3, it will be clearly seen that the fan 2 comprises blades which extend radially through the primary and secondary flow paths 10 and 13 as well as through the space 18 formed between the annular members 11 and 12. These members 11 and 12 are interrupted to allow for the passage of the blades 17, and the blades are provided with inner and outer platforms 19 and 20 which bridge between the upstream and downstream parts of the first and second annular members 11 and 12 to restore as far as possible the continuity of the walls of the flow paths 10 and 13. However, it is unavoidable that gaps 21 will exist between the platforms and the annular members, and that gas will leak from the primary flow path 10 to the secondary flow path 13 through the space 18. Such leakage can be damaging for the reasons explained earlier, and labyrinth seals formed by interleaved profiles of a type commonly used in aeronautics may be fitted to reduce the leakage by imposing a head loss on the leaking gas, but their effect is insufficient.

To overcome this problem the invention provides an annular intermediate gas flow path 22 in part of the space 18 at least in front of the gaps 21. In the embodiment shown, this flow path 22 is defined by the outer platforms 20 of the fan blades 17 and intermediate platforms 23 of the blades which are spaced a short distance radially inwardly from the outer platforms 20. The intermediate flow path 22 is extended by disposing a ring 24 adjacent the downstream end of the intermediate platforms 23 by means of arms 25 which connect the ring to the annular member 12.

Take-off means 26, for example valves, are arranged around the low pressure compressor 1 to extract some of the gas flowing through it and to direct the gas into the intermediate flow path 22 in the form of a longitudinally flowing stream 27 which diverts the gases which have leaked into the space 18 from the primary flow path 10 through the gaps 21. The platforms 20,23 are of variable diameter which increases towards the downstream end of the fan 2 to form a small centrifugal compressor which increases the pressure of the gas flowing through the annular passage 22 between the platforms 20,23. The pressure level is thus higher at the downstream end of the fan 2, and this enables the gas flow issuing from the intermediate flow path 22 to re-enter the primary flow path 10, where the pressure level is lower, via the gaps 21. The intermediate flow path 22 thus constitutes a sealing barrier preventing the hot gases leaking from the primary flow path from entering the secondary flow path. There is therefore no risk to the integrity of the parts in the environs of the secondary flow path 13.

The invention is, of course, not limited to the embodiment just described, and may be implemented in other ways. For example, the intermediate flow path may be arranged otherwise, and the take-off means 26 may open into another part of the engine.

We claim:

1. A bypass engine comprising a primary gas flow path and a secondary gas flow path, a fan having blades disposed both in said primary gas flow path and in said secondary gas flow path, said fan also having first and second annular platforms partly bounding said primary and secondary gas flow paths respectively, first and second annular members respectively aligned with said first and second annular platforms and defining therewith a space between said primary and secondary gas flow paths, means defining an annular intermediate gas flow path in said space at least in front of the gaps existing between said annular platforms and said annular members, and means for blowing a flow of gas through said intermediate gas flow path.

2. A bypass engine according to claim 1, wherein said fan has a third annular platform situated between said first and second annular platforms, and said intermediate gas flow path is defined partly by said third platform and partly by one of said first and second platforms.

3. A bypass engine according to claim 2, wherein said platforms which define said intermediate gas flow path have diameters which increase towards the downstream end of said fan.

4. A bypass engine according to claim 1, wherein said engine includes a compressor, and said means for blowing gas through said intermediate gas flow path comprises gas take-off means connected to said compressor and disposed to direct the gas taken from said compressor through said intermediate flow path in the longitudinal direction of said engine.

* * * * *